(12) United States Patent
Scharkowski

(10) Patent No.: US 10,766,098 B2
(45) Date of Patent: Sep. 8, 2020

(54) ULTRASONIC WELDING APPARATUS AND METHOD

(71) Applicant: Auto-Kabel Management GmbH, Hausen i.W. (DE)

(72) Inventor: Oliver Scharkowski, Zell im Wiesental (DE)

(73) Assignee: Auto-Kabel Management GmbH, Hausen i.W. (DE)

(*) Notice: Subject to any disclaimer, the term of this patent is extended or adjusted under 35 U.S.C. 154(b) by 0 days.

(21) Appl. No.: 16/491,069

(22) PCT Filed: Jan. 18, 2018

(86) PCT No.: PCT/EP2018/051190
§ 371 (c)(1),
(2) Date: Sep. 4, 2019

(87) PCT Pub. No.: WO2018/162128
PCT Pub. Date: Sep. 13, 2018

(65) Prior Publication Data
US 2020/0009681 A1 Jan. 9, 2020

(30) Foreign Application Priority Data

Mar. 6, 2017 (DE) .................. 10 2017 104 615

(51) Int. Cl.
*B23K 20/10* (2006.01)
*H01R 4/02* (2006.01)
(Continued)

(52) U.S. Cl.
CPC ........... *B23K 20/106* (2013.01); *H01R 4/023* (2013.01); *H01R 43/0207* (2013.01); *B23K 2101/38* (2018.08); *B23K 2103/10* (2018.08)

(58) Field of Classification Search
CPC ............... H01R 43/0207; H01R 4/023; B23K 2101/38; B23K 2103/10; B23K 20/10–106; B23K 1/06
(Continued)

(56) References Cited

U.S. PATENT DOCUMENTS 4,097,327 A * 6/1978 Calemard ............. B29C 66/137
156/515
4,730,764 A * 3/1988 Hawkins ............ H01R 43/0207
228/1.1
(Continued)

FOREIGN PATENT DOCUMENTS

CN 1701943 A 11/2005
DE 37 45 065 C1 5/1994
(Continued)

OTHER PUBLICATIONS

European Patent Office, International Search Report and Written Opinion of the International Searching Authority, dated May 3, 2018, (with English translation of the International Search Report), 15 pages.
(Continued)

*Primary Examiner* — Kiley S Stoner
(74) *Attorney, Agent, or Firm* — Sunstein LLP

(57) ABSTRACT

Ultrasonic welding device comprising a sonotrode 20 and a counterbearing 2 opposite the sonotrode 20. The welding connection is improved in which the counterbearing 2 is movably mounted parallel to in a plane of oscillation of the sonotrode 20.

7 Claims, 3 Drawing Sheets

(51) Int. Cl.
*H01R 43/02* (2006.01)
*B23K 103/10* (2006.01)
*B23K 101/38* (2006.01)

(58) Field of Classification Search
USPC .............. 228/110.1, 1.1; 156/580.1–580.2, 156/73.1–73.4
See application file for complete search history.

(56) References Cited

U.S. PATENT DOCUMENTS

| | | | | |
|---|---|---|---|---|
| 4,842,671 | A * | 6/1989 | Nuss | B23K 20/106 156/433 |
| 4,869,419 | A * | 9/1989 | Nuss | B23K 20/106 228/110.1 |
| 8,409,383 | B1 * | 4/2013 | Tan | B23K 20/10 156/580.1 |
| 2003/0136497 | A1 * | 7/2003 | Hamulski | B32B 5/26 156/73.1 |
| 2003/0173015 | A1 * | 9/2003 | Hamulski | B29C 66/83411 156/73.1 |
| 2005/0257895 | A1 | 11/2005 | Motoda | |
| 2007/0000890 | A1 * | 1/2007 | Steiner | B23K 11/0026 219/124.34 |
| 2010/0024956 | A1 * | 2/2010 | Vogler | B29C 66/9513 156/73.3 |
| 2011/0155701 | A1 * | 6/2011 | Gerst | H01R 43/0214 219/117.1 |
| 2012/0118476 | A1 * | 5/2012 | Weiler | B65B 51/225 156/64 |
| 2012/0186719 | A1 * | 7/2012 | Van Den Aker | B29C 66/81469 156/73.1 |
| 2013/0228611 | A1 * | 9/2013 | Byars | H01L 24/75 228/1.1 |
| 2014/0069570 | A1 * | 3/2014 | Strasser | G02B 6/4486 156/73.1 |
| 2014/0134873 | A1 * | 5/2014 | Lehmann | H01R 4/2495 439/421 |
| 2015/0128772 | A1 | 5/2015 | Hannig | |
| 2015/0165719 | A1 * | 6/2015 | Wieduwilt | B31F 5/008 156/73.1 |
| 2015/0274337 | A1 * | 10/2015 | Beauvy | B29C 66/1122 53/479 |
| 2015/0288123 | A1 * | 10/2015 | Wagner | H01R 43/0207 228/110.1 |
| 2016/0006138 | A1 * | 1/2016 | Harms | B23K 20/10 174/74 A |
| 2017/0225275 | A1 * | 8/2017 | Hwang | B23K 20/10 |
| 2018/0178313 | A1 * | 6/2018 | Nakayama | B23K 20/26 |
| 2019/0001430 | A1 * | 1/2019 | Malchow | B26D 7/086 |
| 2019/0165532 | A1 * | 5/2019 | Sato | H01R 4/023 |
| 2019/0165533 | A1 * | 5/2019 | Nabeta | B23K 20/10 |
| 2019/0273355 | A1 * | 9/2019 | Sato | B23K 20/004 |
| 2020/0035642 | A1 * | 1/2020 | Egusa | G01N 29/14 |

FOREIGN PATENT DOCUMENTS

| | | | | |
|---|---|---|---|---|
| DE | 103 56 431 | A1 | 6/2005 | |
| DE | 102016210590 | A1 * | 12/2017 | ............ B23K 37/04 |
| EP | 0 161 647 | | 11/1985 | |
| WO | WO-2004091841 | A1 * | 10/2004 | ........... B29C 66/932 |
| WO | WO-2011009959 | A1 * | 1/2011 | ............. B23K 20/10 |

OTHER PUBLICATIONS

Telsonic Ultrasonics Telsonics, "Powerwheel—Metallschweissen in einer neuen Dimension—Telsonic Ultrasonics," https://web.archive.org/web/20160707074717/https://www.telsonic.com/de/produktspectrum/powerwheel-metallschweissen/, Jul. 7, 2016, 2 pages.

German Patent Office, Office Action, Application No. 10 2017 104 615.1, dated Sep. 5, 2017, 5 pages.

* cited by examiner

ULTRASONIC WELDING APPARATUS AND METHOD

CROSS-REFERENCE TO RELATED APPLICATIONS

This application is the national phase entry of international patent application no. PCT/EP2018/051190 filed Jan. 18, 2018 and claims the benefit of German patent application No. 10-2017-104-615.1, filed Mar. 6, 2017, the disclosures of which are incorporated herein by reference in their entirety.

TECHNICAL FIELD

The subject matter relates to an ultrasonic welding device and a method of ultrasonic welding.

BACKGROUND ART

The joining of components by means of ultrasound is known from the prior art. The use of an ultrasonic welding process is particularly advantageous for joints with aluminium, as an aluminium oxide layer is broken up when welding with ultrasound. Due to the increasing use of aluminium stranded conductors in automotive applications, ultrasonic welding is becoming more and more popular.

In ultrasonic welding, the workpieces, in particular a stranded wire and a connecting part, are pressed together by means of a sonotrode and an anvil. The anvil as a passive tool serves in particular together with hold-down devices as a support and for fixing and/or holding down a first workpiece. The sonotrode as an active tool presses the second workpiece against the first workpiece and introduces an ultrasonic oscillation into the workpieces. Due to the ultrasonic oscillation introduced via the sonotrode, the required welding energy is generated at the connection point between the workpieces, e.g. the stranded conductor and the connecting part, in order to melt their joining partners and to connect the workpieces to each other in a material-locking manner.

However, the disadvantage of the prior art process is that only the sonotrode as an active tool introduces welding energy into the materials to be joined. The anvil is regularly mounted statically as a passive tool and does not perform any movement of its own during ultrasonic welding. This results in the sonotrode introducing welding energy only on one side into the materials to be joined. This, however, only one-sided energy input can result in the strands of the stranded cable coming into contact with the sonotrode being damaged, especially when welding stranded cables, especially with larger cross-sections. The outer strands of the stranded conductor, which serve as a coupling surface for the energy input, can be damaged during the prior art process. This leads to the disadvantage that stranded conductors can only be welded with smaller cross-sections using ultrasound without damage. Stranded cables with larger cross-sections, for example over 16 mm$^2$, can be damaged, especially if higher welding energy is introduced into the first strand layer. Especially when joining stranded conductors with larger cross-sections, the required mechanical strength of the material-locking connection can no longer be guaranteed.

For this reason, the subject matter was based on the task of providing an ultrasonic welding device and a process for ultrasonic welding, which would enable reliable connections of stranded wires of larger cross-section with connecting parts.

SUMMARY OF THE INVENTION

Surprisingly, the inventor has recognized that ultrasonic processing is advantageous, especially for stranded wires, especially those made of aluminum material, with cross-sections greater than 16 mm$^2$, especially greater than 50 mm$^2$, preferably up to 200 mm$^2$, with a dynamic counterbearing to the sonotrode. It has been recognised that the dynamic mounting of the counterbearing enables the counterbearing to oscillate parallel to an oscillation plane of the sonotrode. The possibility of the counterbearing to move in a plane parallel to the plane of oscillation of the sonotrode, in particular to oscillate, results in significant advantages over a static arrangement of the counterbearing as known from the prior art. The dynamic bearing arrangement of the counterbearing enables connections with higher mechanical strength and shorter process times. It has been recognized that the mechanical strength of the joint between the parts to be joined is increased by the dynamic bearing of the counterbearing with the same high energy input by means of the sonotrode. As a result, the energy consumption per joint can be reduced, thus reducing energy costs and, at the same time, the joining quality remains constant compared to the prior art.

With the aid of the movable counterbearing, it is possible to couple the ultrasonic waves coupled into the workpiece by the sonotrode into the counterbearing. The flywheel mass of the counterbearing, which is excited by the coupled sonic waves of the vibrating sonotrode, can be set in motion by a dynamic mounting of the counterbearing in the plane of oscillation of the sonotrode and its kinetic energy can be introduced into the joining zone.

The oscillation energy coupled into the system by the sonotrode generates a deflection in the dynamically supported counterbearing. This deflection can be periodic according to the deflection of the sonotrode. Furthermore, the deflection takes place in the direction of oscillation/plane of the sonotrode, especially in the horizontal direction/plane in the direction of oscillation of the sonotrode. Of course, the effects described only occur when the sonotrode is activated, i.e. during the welding process. Due to the oscillation of the counterbearing, the kinetic energy is fed back into the workpiece, so that a uniform coupling of welding energy into the workpiece is possible.

Since the counterbearing has a mechanical inertia, the oscillation of the counterbearing takes place with a phase difference or a path difference, so that an opposite deflection of the counterbearing to the sonotrode is made possible by suitable adjustment of process parameters.

For example, when welding a stranded conductor, especially one made of an aluminium material with a connecting element, the oscillation of the counterbearing leads to additional high-frequency friction in the welding area between the stranded conductor and the connecting element. The welding energy is thus introduced into the joining zone between the workpieces via the connecting part by the actively vibrating sonotrode on the top side of the strand and the thus excited counterbearing on the underside of the strand.

The counterbearing may have a friction-enhancing surface on the surface on which the workpiece is supported. This can be done e.g. by mechanical roughening, e.g. by inserting a line marking or roughening.

According to an embodiment, it is proposed that the counterbearing is a sonotrode or an anvil. As a passive component, an anvil can only be excited by the sonotrode. It is also possible to form an active counterbearing in the form of a sonotrode instead of a passive counterbearing. The two sonotrodes can each be driven via a converter and preferably a booster. A control coupling of the two converters can be such that the oscillations of the sonotrode and counterbearing are in opposite directions. In particular, the oscillation can be such that the oscillations show a path difference between a quarter to a half wavelength. In particular, the path difference can be about half a wavelength. The phase difference can be between 90° and 270°, preferably between 120° and 240°, in particular between 170° and 190°, preferably at about 180°.

According to an embodiment, it is proposed that a fastening device is arranged on the counterbearing. With the aid of the fastening device, the workpiece, in particular a connecting part, can be mechanically fixed to the counterbearing. The fastening device is fixed to the counterbearing and is thus set in oscillation together with the counterbearing.

It is also possible for the fastening device to be fixed or dynamically mounted independently of the counterbearing. Like the counterbearing, the fastening device can be dynamically mounted and can also be made to oscillate by the oscillation of the sonotrode. Then the fastening device can oscillate with the workpiece held down on the counterbearing. The fastening device can also be fixed and mounted firmly opposite the sonotrode. A workpiece can, for example, be held by the fastening device in the form of a plain bearing due to a smooth surface of the fastening device.

According to an embodiment, it is proposed that the counterbearing is guided in a linear bearing. A linear slide guide is particularly suitable. This causes the counterbearing to be restricted in the degrees of freedom of its movement. In particular, the counterbearing is mounted with a translatory degree of freedom of 1. The direction of the degree of freedom or the direction of this translational movement is preferably parallel to the direction of movement of the sonotrode.

The excitation of the counterbearing can be adjusted by means of adjustable damping elements, for example. A damping element may be provided which is adjustable in its damping behaviour, in particular in its spring constant. According to an embodiment, it is proposed that a damping element dampens the movement of the counterbearing parallel to the plane of oscillation of the sonotrode. It is also possible to control or regulate the damping of the damping element, especially the spring constant.

The damping elements cause damping of the counterbearing. This prevents the counterbearing from resonating. It is proposed that the damping element causes a damping degree D of the counterbearing of 0<D≤1.

According to an embodiment, it is proposed that the counterbearing is mounted in such a way that during welding its direction of movement is opposite to the direction of movement of the sonotrode.

According to an embodiment, it is proposed that the counterbearing is mounted in such a way that its oscillation has a path difference of about half a wavelength from the oscillation of the sonotrode.

It is also conceivable to optimise the oscillation behaviour of the counterbearing via its mass by varying the geometric dimensions or mass deposits, e.g. by providing a lead core. In particular, the density distribution in the counterbearing can be uneven. In particular, a core of the counterbearing can be made of a material with a different density than an outer layer, in particular as the layer forming the surface for the workpiece.

The ultrasonic welding described here can be longitudinal ultrasonic welding, torsional ultrasonic welding or ultrasonic roll welding. The bearing of the counterbearing is preferably the same as the direction of movement of the sonotrode. In the case of torsional ultrasonic welding or ultrasonic roll welding, the counterbearing can be rotatably mounted to simulate the rotation of the sonotrode.

Another aspect can be a measurement of the oscillation of the counterbearing. The oscillation of the counterbearing can be detected optically and/or electrically, electronically. For example, the movement of the counterbearing can be measured via laser measurement. Here a fixed point (marking) on the counterbearing can be measured by a laser in its deflection. The movement can also be measured via distance sensors. The measured oscillation can be put into a relation with the introduced oscillation. In particular, the amplitude of the counterbearing can be brought into line with the welding energy applied by the sonotrode. From this, conclusions can be drawn about the mechanical coupling between counterbearing and sonotrode during the welding process. This can be used to evaluate the welding quality. This measurement can be combined with all the features described here.

BRIEF DESCRIPTION OF THE DRAWING

In the following, the subject matter is explained in more detail using a drawing showing embodiments. In the drawings show:

FIG. 1b a top view of the counterbearing according to FIG. 1a;

DETAILED DESCRIPTION OF SPECIFIC EMBODIMENTS

Figure 1A:
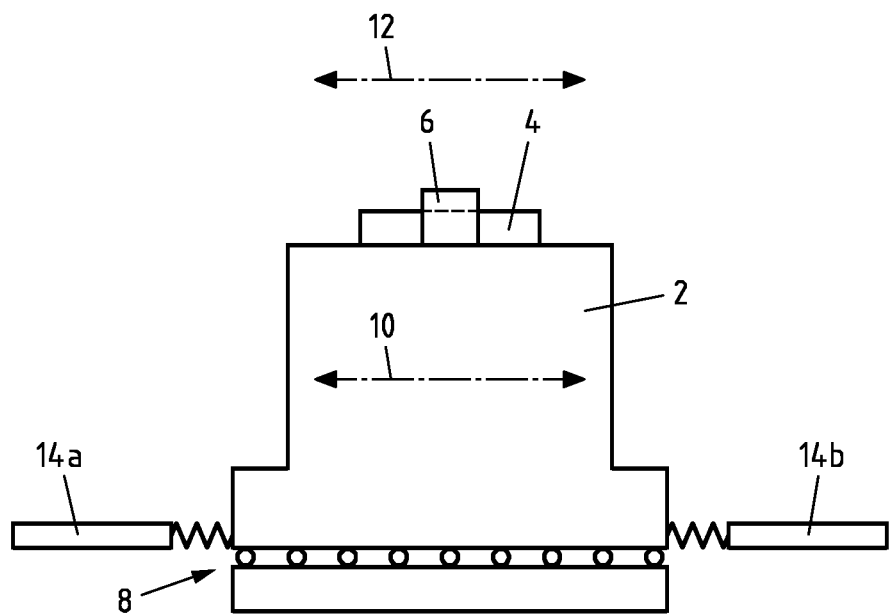
FIG. 1a a side view of an oscillating counterbearing.

FIG. 1a shows a counterbearing 2 formed as an anvil. The counterbearing 2 is intended as a bearing surface for a connecting part 4. The connecting part 4 is held in place with fasteners 6, which are fixed to the counterbearing 2. The fasteners 6 can be, for example, clamps, hooks or other suitable means which can fix a connecting part 4 to the counterbearing 2 in a fixed position.

FIG. 1a also shows that the counterbearing 2 is mounted on a rolling guide 8, e.g. a linear guide or a rail guide. The bearing on the rolling guide 8 is such that the movement of the counterbearing 2 has exactly one degree of freedom which runs along axis 10. The axis 10 runs essentially parallel to the axis of the oscillation direction 12, with which a sonotrode oscillates.

To prevent the counterbearing 2 from overshooting, 2 damping elements 14a, 14b are provided on the counterbearing 2. The damping elements 14a, 14b can have fixed as well as variable adjustable spring constants. It is also possible that the damping characteristics, in particular the spring constant of the damping elements 14, can be controlled or regulated. The degree of damping of the system consisting of damping elements 14 and counterbearing 2 as well as rolling guide 8 is preferably greater than 0 and less than or equal to 1.

Figure 1B:
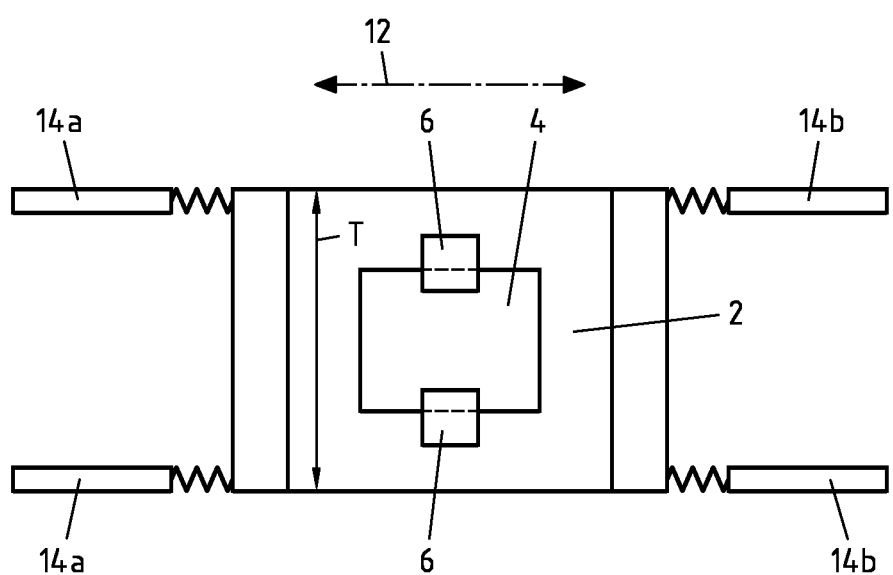

FIG. 1b shows the counterbearing 2 in a plan view. It can be seen that the damping elements 14a, 14b are arranged as symmetrically as possible along a plane of symmetry perpendicular to the direction of oscillation of the sonotrode along axis 12. As a result, the deflection of the counterbearing 2 in the direction of axis 10 is uniform over its entire depth T if possible.

Figure 2:
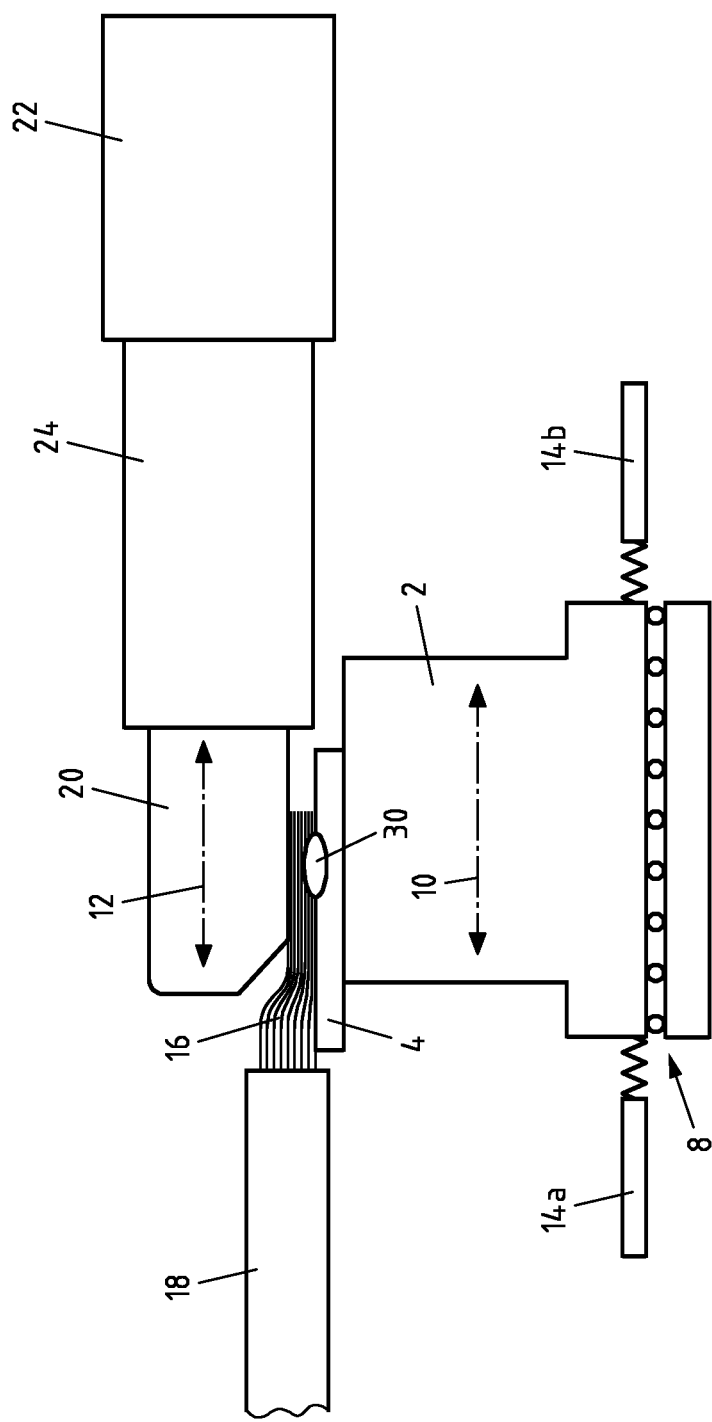
FIG. 2 a schematic view of a welding device with a passive counterbearing.

To weld a connecting part 4 to a stranded wire 16 of a cable 18, these workpieces are clamped between a sonotrode 20 and the counterbearing 2 as shown in FIG. 2.

In FIG. 2 the counterbearing 2 is mounted according to the embodiments shown in FIGS. 1*a* and *b*. The connecting part 4 is fixed to the surface of the counterbearing 2 facing the sonotrode 20, which here is an anvil. For this purpose, it is fixed to the surface facing the sonotrode 20 by means of fastener 6.

Subsequently, a stranded wire 16 preferably at a stripped end of a cable 18 is put on the connecting part 4 and the sonotrode 20 presses the stranded wire 16 onto the connecting part 4.

For welding, the sonotrode 20 is now made to oscillate so that the sonotrode 20 oscillates along axis 12. A converter 22 and a booster 24 are provided for this purpose.

During the welding process, the oscillation along axis 12 is introduced by sonotrode 20 into the joint between connecting part 4 and stranded wire 16.

As the counterbearing 2 is mounted in a floating manner, the counterbearing 3 is also excited to oscillate along axis 10. This leads to not only a linear elongation of the sonotrode 20, but also of the counterbearing 2. These two linear elongations result in the welding energy being introduced not only on the side of the stranded conductor 16 facing the sonotrode 20 into the joint 30 between the stranded conductor 16 and the connecting part 4, but also on the underside, on the side of the stranded conductor 16 facing the connecting part 4. The connecting part 4 together with the counterbearing 2 is made to vibrate and therefore also leads to an entry of welding energy into the joint 30 between the connecting part 4 and the stranded wire 16.

Figure 3:
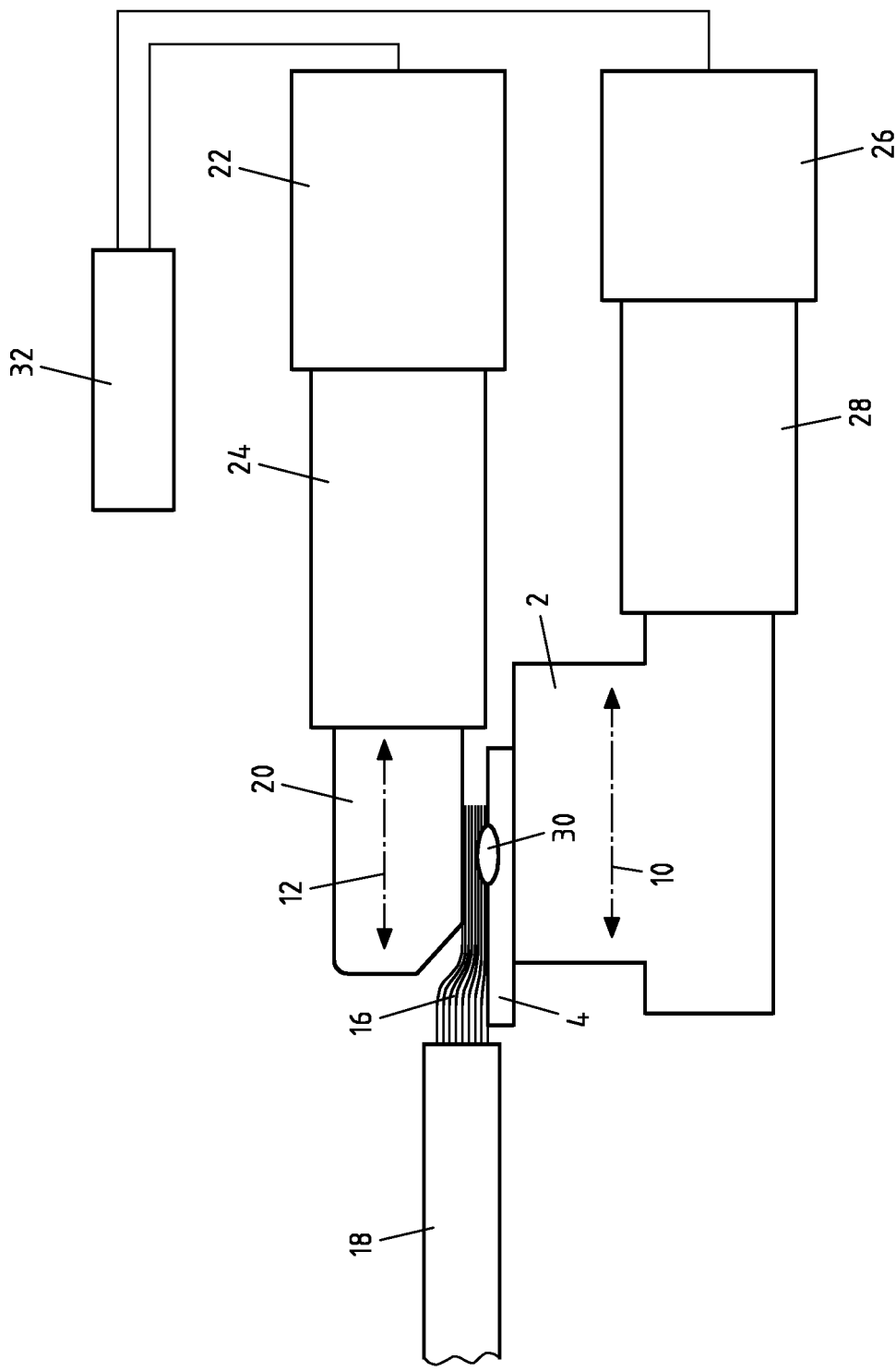
FIG. 3 a schematic view of a welding device with an active counterbearing.

FIG. 3 shows a system similar to FIG. 2, where the same reference signs show the same elements. In contrast to FIG. 2, the counterbearing 2 is not a passive anvil, but an actively operated sonotrode. This sonotrode 2 is also operated by a converter 26 and a booster 28. The connecting part 4 is also fixed to the counterbearing 2 as shown in FIG. 2. The stranded wire 16 of the cable 18 is attached to this. The joining zone 30 is formed between the stranded wire 16 and the connecting part 4 in the area of the Sonotrode 20 and the counterbearing 2. The axes 10 and 12 also run parallel to each other in the system according to FIG. 3.

The movement along axes 10 and 12 for sonotrode 20 and counterbearing 2 respectively is controlled by a control device 32. Here, the control device 32 can control the movement in such a way that the movements of counterbearing 2 and sonotrode 2 along their respective movement axes 10, 12 are in opposite directions. In particular, a path difference between the oscillations is between a quarter and a half wavelength or the phase difference between the oscillations is between 90 and 270°, preferably between 120° and 240°, in particular between 170 and 190°. In particular, the phase difference of the oscillations is about 180°. Due to these counter oscillations, the welding energy is optimally introduced into the joining zone 30 by the sonotrode 20 and the counterbearing 2.

Tests have shown that with shorter welding times, higher tensile strengths of the joints are achieved. This means that only a shorter welding time is required for the same tensile strength compared to conventional welding devices. The tensile strength at the same welding time is increased by up to 100% compared to conventional welding devices.

Tests have also shown that the introduction of welding energy on both sides of the joint, i.e. the sonotrode and the counterbearing, can reduce or prevent damage to the strands of the stranded wire. The sonotrode can be operated with a lower power so that it does not damage the top strand layer.

The dynamically mounted counterbearing also allows the oscillation of the counterbearing to be measured. This measurement makes it possible to draw conclusions about the welding process and thus about the quality of the welded joint.

The welding device according to the subject matter enables a particularly uniform introduction of the welding energy into the joint by applying oscillations to both sides of the stranded conductor, both from the side facing away from the connecting part and from the side of the stranded conductor facing the connecting part. This means that the stranded wire is less damaged and the welding energy is distributed more evenly over the joint

LIST OF REFERENCE SIGNS

2 Counterbearings
4 Connecting part
6 Fasteners
8 Rolling guide
10 Axis
12 Axis
14 Damping element
16 Stranded conductor
18 Cables
20 Sonotrode
22 Converter
24 Booster
26 Converter
28 Booster
30 Joining zone
32 Control

What is claimed is:

1. A method for welding a connecting part with a stranded conductor using an ultrasonic welding device having a sonotrode and a counterbearing opposite the sonotrode, wherein the counterbearing is movably mounted parallel to a direction of oscillation of the sonotrode, and wherein the counterbearing is mounted dynamically such that it is periodically elongated by the oscillation energy coupled in by the activated sonotrode, comprising:
   fastening the connecting part to the counterbearing;
   placing the stranded wire on the connecting part;
   pressing the sonotrode onto the stranded conductor; and
   introducing, from the sonotrode, an ultrasonic oscillation perpendicular to the surface normal of the connecting part into the stranded conductor, the counterbearing oscillating relative to the sonotrode in a direction of oscillation parallel to the direction of oscillation of the sonotrode.

2. The method for welding according to claim 1, wherein the counterbearing is a sonotrode or an anvil.

3. The method for welding according to claim 1, wherein a fastening device for a workpiece is fastened to the counterbearing.

4. The method for welding according to claim 1, wherein the counterbearing is guided in a plane bearing or a linear bearing.

5. The method for welding according to claim 1, wherein the counterbearing is mounted with one degree of translatory freedom, the direction of the translatory movement of the counterbearing being parallel to the movement of the sonotrode.

6. The method for welding according to claim 1, further comprising a damping element which is arranged to dampen the movement of the counterbearing parallel to the oscillation plane of the sonotrode.

7. The method for ultrasonic welding according to claim 1, further comprising measuring the deflection of the counterbearing during the welding process.

\* \* \* \* \*

UNITED STATES PATENT AND TRADEMARK OFFICE
CERTIFICATE OF CORRECTION

PATENT NO. : 10,766,098 B2
APPLICATION NO. : 16/491069
DATED : September 8, 2020
INVENTOR(S) : Oliver Scharkowski It is certified that error appears in the above-identified patent and that said Letters Patent is hereby corrected as shown below:

In the Claims

In Column 6, Line 48 Claim 1:
Insert --the method-- before "comprising"

In Column 7, Line 8 Claim 7:
Delete "ultrasonic"

Signed and Sealed this
Twenty-second Day of December, 2020

Andrei Iancu
*Director of the United States Patent and Trademark Office*